US006349894B1

(12) United States Patent
Daoud et al.

(10) Patent No.: US 6,349,894 B1
(45) Date of Patent: Feb. 26, 2002

(54) DEVICE AND METHOD FOR STORING SLACK FIBER

(75) Inventors: Bassel Hage Daoud, Parsippany; Christopher M. Helmstetter, Bridgewater; Jason A. Kay, Morristown; David S. Kerr, Morris Plains, all of NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/441,480

(22) Filed: Nov. 17, 1999

(51) Int. Cl.[7] .............................................. B65H 75/44
(52) U.S. Cl. ..................... 242/399.2; 242/407; 242/900
(58) Field of Search ........................... 242/399.2, 400.1, 242/402, 405.1, 405.2, 407, 613, 900, 917, 222, 899

(56) References Cited

U.S. PATENT DOCUMENTS 3,443,771 A * 5/1969 Doty ........................ 242/405.1
5,655,728 A * 8/1997 Yang ......................... 242/395.1

* cited by examiner

Primary Examiner—John Q. Nguyen (57) ABSTRACT

An assembly includes an enclosure and a device for storing fiber slack. The device has a pair of spool portions on opposite sides of the device. Each spool portion is shaped so that fiber slack can be wound back and forth between the two spool portions. The device is pivotally mounted within the enclosure, so that the pair of spool portions can be accessed by pivoting the device. Each spool portion may have a semicircular shape. Each spool portion has a radius at least as large as a minimum bend radius for a fiber to be stored on the device. A length of a fiber portion extending between the pair of spool portions is substantially greater than a perimeter of one of the spool portions. The device has top and bottom U-shaped channels connecting the tops and bottoms of the spool portions, respectively. The pair of spool portions and the top and bottom U-shaped channels form an elongated spool for storing fiber, the elongated spool extending around three sides of the device. The enclosure has a pin or rod mounted in it. The device has a bore extending through it, for receiving the pin or rod, to pivotally mount the device in the enclosure. A splice holder may be mounted within the enclosure.

19 Claims, 6 Drawing Sheets

DEVICE AND METHOD FOR STORING SLACK FIBER

FIELD OF THE INVENTION

DESCRIPTION OF THE RELATED ART

Optical fiber communication networks have gained wide acceptance in place of the use of electrical cable systems, due to the significantly enhanced bandwidth capabilities of optical fiber and its immunity to electromagnetic and radiomagnetic interference. Very significant advantages are achievable by the use of optical fiber rather than electrical conduction media. A continuing challenge in using fiber is providing enclosures for optical connections to fibers while providing adequate environmental protection and allowing for easy installation and configuration changes.

To simplify later modifications to the fiber interconnections, it is customary to leave a length of slack in each fiber within the enclosure. In an enclosure containing many fiber splices or terminations, there may be a large number of fibers adding up to a large volume of slack. A substantial amount of storage space may be required to accommodate the slack.

Slack fiber is typically wound around a barrel or spool that is mounted in the enclosure. An enclosure may typically have two or three such fiber storage barrels. Typically, the enclosure is configured to accommodate more than two terminations or splices. When the number and/or length of the slack fibers grows larger, the volume of slack fiber may exceed the capacity of the fiber storage barrels in the enclosure. Further, it is desirable to separate the fibers in a given cable and store the slack for each fiber separately, to facilitate working on the individual fibers.

An improved device and method for storing slack fiber is desired.

SUMMARY OF THE INVENTION

One aspect of the invention is a device for storing fiber slack. The device has a pair of spool portions on opposite sides of the device. Each spool portion is shaped so that fiber slack can be wound back and forth between the two spool portions. The device is capable of being pivotally mounted within an enclosure, so that the pair of spool portions can be accessed by pivoting the device.

Another aspect of the invention is an assembly including an enclosure and a device for storing fiber slack. The device has a pair of spool portions on opposite sides of the device. Each spool portion is shaped so that fiber slack can be wound back and forth between the two spool portions. The device is pivotally mounted within the enclosure, so that the pair of spool portions can be accessed by pivoting the device.

Still another aspect of the invention is a method for storing slack fiber. The method includes the steps of: winding the fiber around a first spool portion on a first side of a storage device; winding the fiber around a front end of the storage device; pivoting the device; and winding the fiber around the second spool portion.

The above and other features of the present invention will be better understood from the following detailed description of the exemplary embodiment of the invention which is provided in connection with the accompanying drawings.

DETAILED DESCRIPTION

FIGS. 1–4 show an exemplary device 100 according to the present invention. The device 100 is suitable for storing fiber slack 60, and is particularly advantageous for use with optical fibers.

The device 100 has a pair of spool portions 10, 11 on opposite sides of the device. Each spool portion 10, 11 is shaped so that fiber slack 60 can be wound back and forth between the two spool portions. Each exemplary spool portion 10, 11 has a substantially semicircular shape. Each spool portion 10, 11 has a radius at least as large as a minimum bend radius $R_{MIN}$ for a fiber 60 to be stored on the device 100. A radius greater than $R_{MIN}$ may also be used.

A top U-shaped channel 32 extends between the top of the first spool portion 10 and the top of the second spool portion 11. Channel 32 is formed between two elongated lands or walls 31 and 33, each of which wraps around three sides 20, 30, and 40 of the device 100. A bottom U-shaped channel 35 extends between a bottom of the first spool portion 10 and the bottom of the second spool portion 11. Channel 35 is formed between two elongated lauds or walls 34 and 36, each of which wraps around three sides of the device 100. The lands or walls 31, 33, 34 and 36 help protect the fiber 60 and prevent the fiber at the top of the device 100 from contacting the fiber at the bottom of the device. U-shaped channels 32 and 35 have radii greater than or equal to $R_{MIN}$.

The pair of spool portions 10, 11 and the top and bottom U-shaped channels 32, 35 form an elongated spool for storing fiber 60. The elongated spool extends around three sides 20, 30, and 40 of the device.

Although the exemplary spool portions 10 are semicircular in shape, other curved shapes (such as semi-ellipses) may be used so long as the minimum radius of curvature for the spool portion is greater than or equal to the minimum allowable radius $R_{MIN}$ for the type of fiber being stored on the device.

Although the examples shown included all radii of curvature equal to $R_{MIN}$ larger values may be used, either for the spool portions 10, 11 or the curved end side 30 of the device or both. Increasing either the radii of spool portions 10 and 11 or the radius of the U-shaped channels 32 and 35 on the front end 30 increases the footprint of the device (whereas increasing the length L does not increase the footprint), but also increases the length of slack fiber that can be stored on the device.

Figure 1:
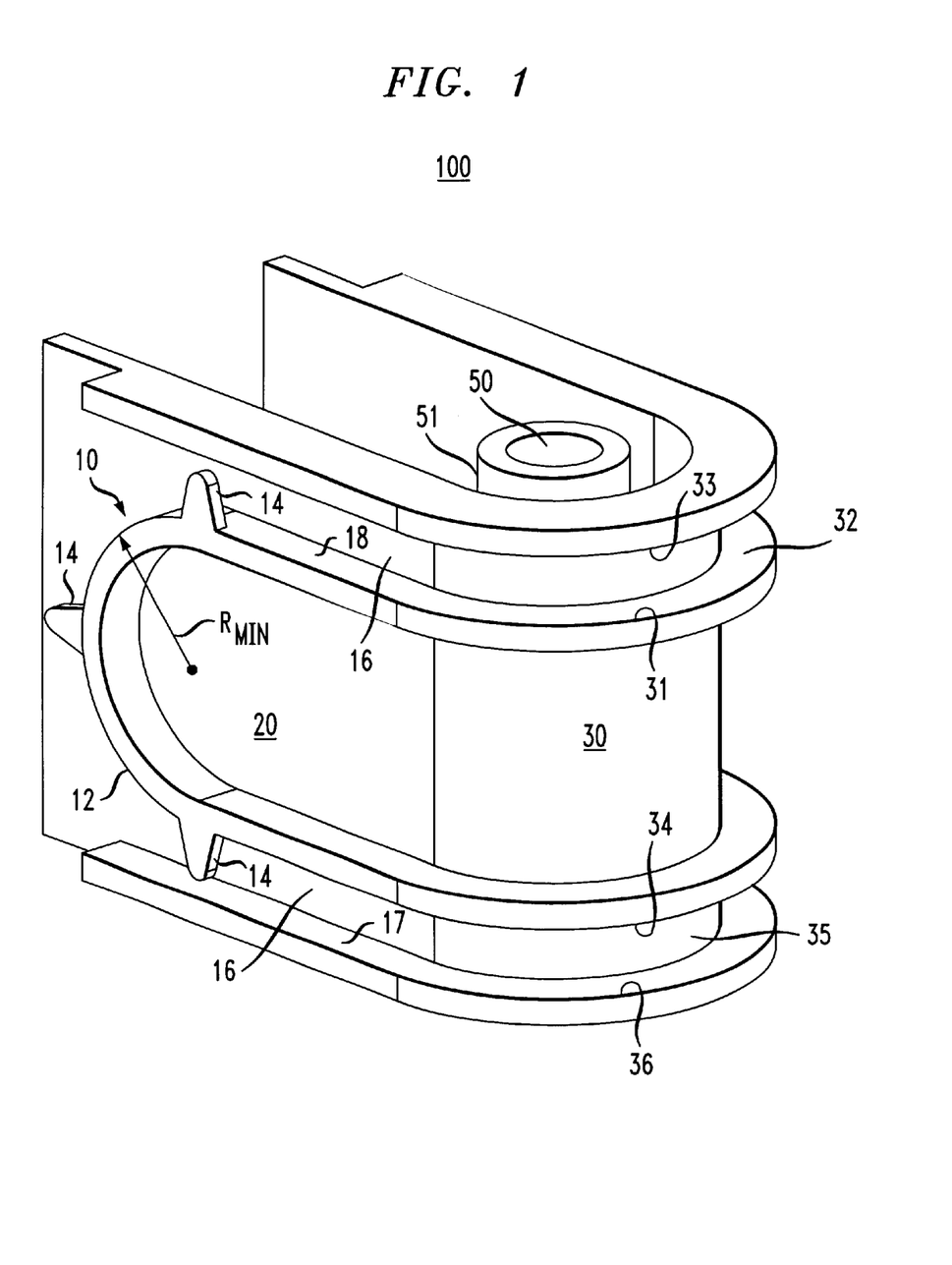
FIG. 1 is a front isometric view of an exemplary device according to the present invention.
Figure 2:
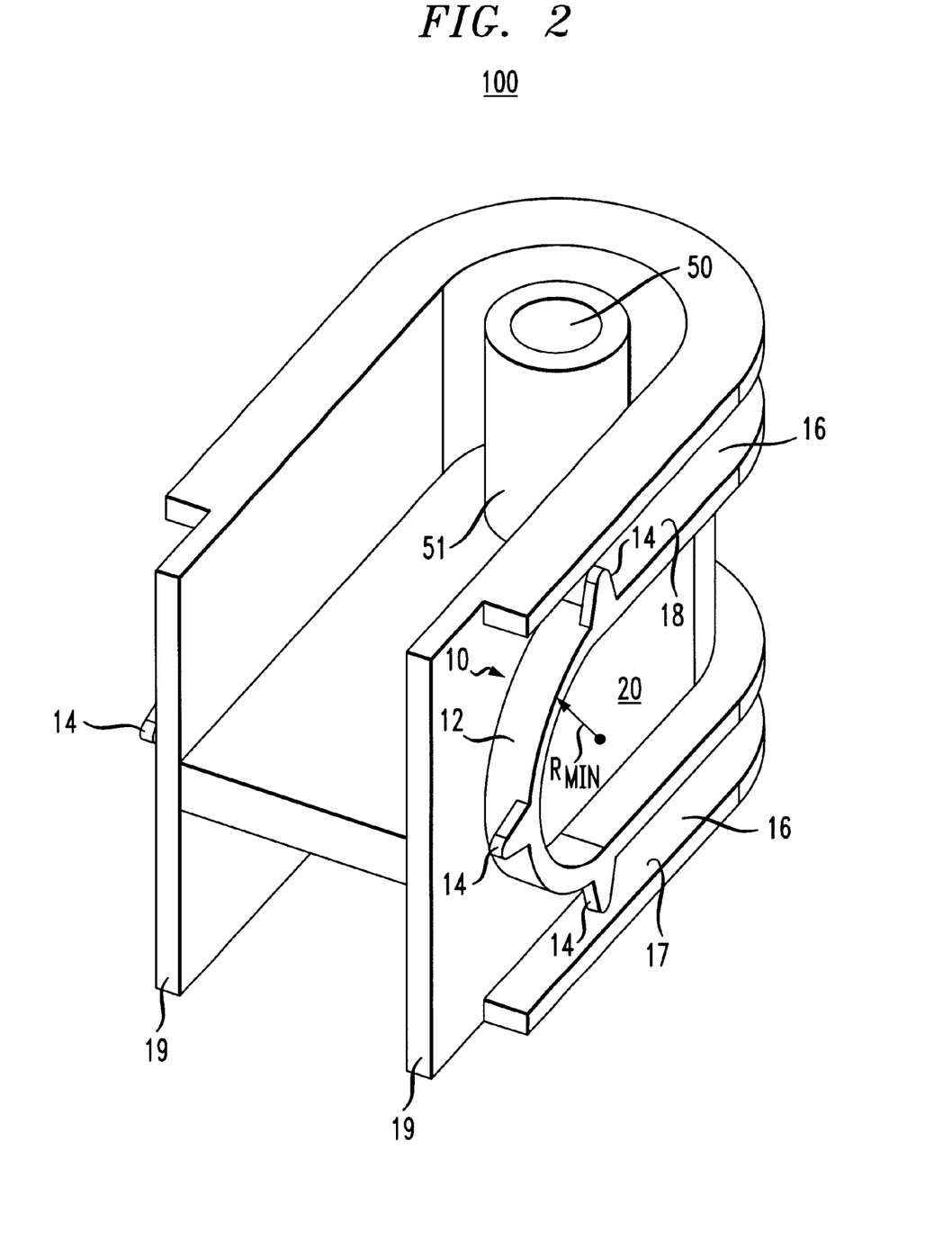
FIG. 2 is a rear isometric view of the device shown in FIG. 1.
Figure 3:
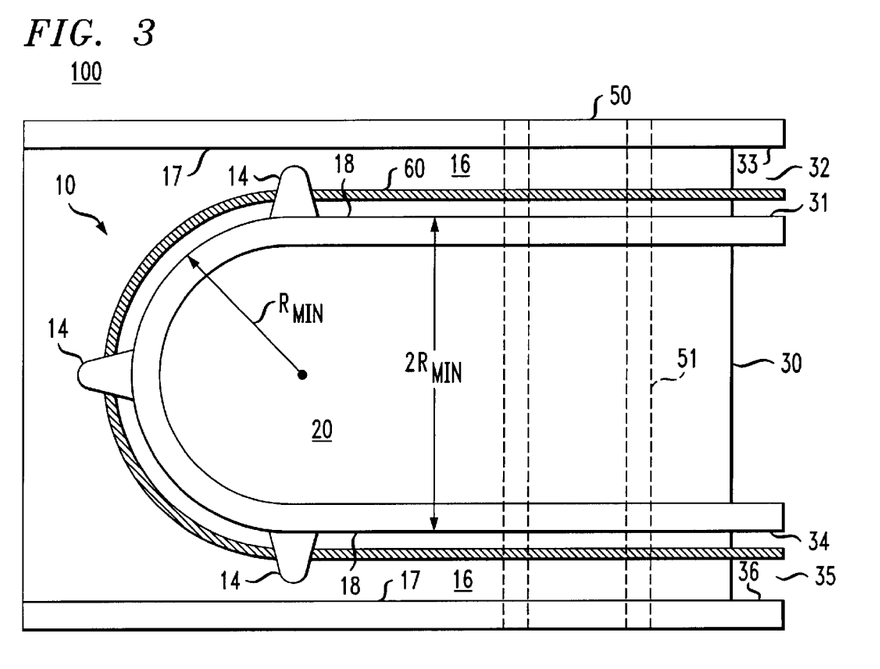
FIG. 3 is a side elevation view of the device shown in FIG. 1.
Figure 4:
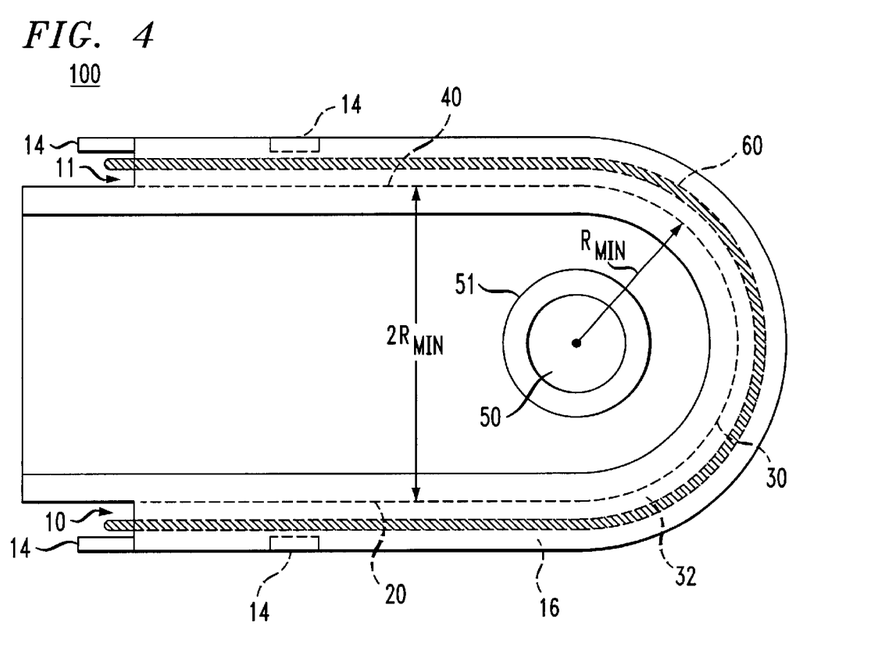
FIG. 4 is a top plan view of the device shown in FIG. 1

The device 100 is capable of being pivotally mounted within an enclosure (as described below with reference to FIGS. 5–7), so that the pair of spool portions 10, 11 can be alternately accessed by alternately pivoting the device in opposite directions by up to 180 degrees. The device 100 has a bore 50 extending therethrough, for receiving a pin or rod (described below with reference to FIGS. 5–7), to pivotally mount the device. In the exemplary embodiment, the device 100 is substantially hollow (as shown in FIG. 2), and a cylindrical wall 51 defines the bore. Alternatively, the device 100 may be formed as a solid body, with a bore formed therethrough.

Exemplary materials for forming device 100 include plastics, such as polycarbonate, polyvinyl chloride (PVC) or acrylonitrile-butadiene-styrene (ABS) copolymer.

Figure 5:
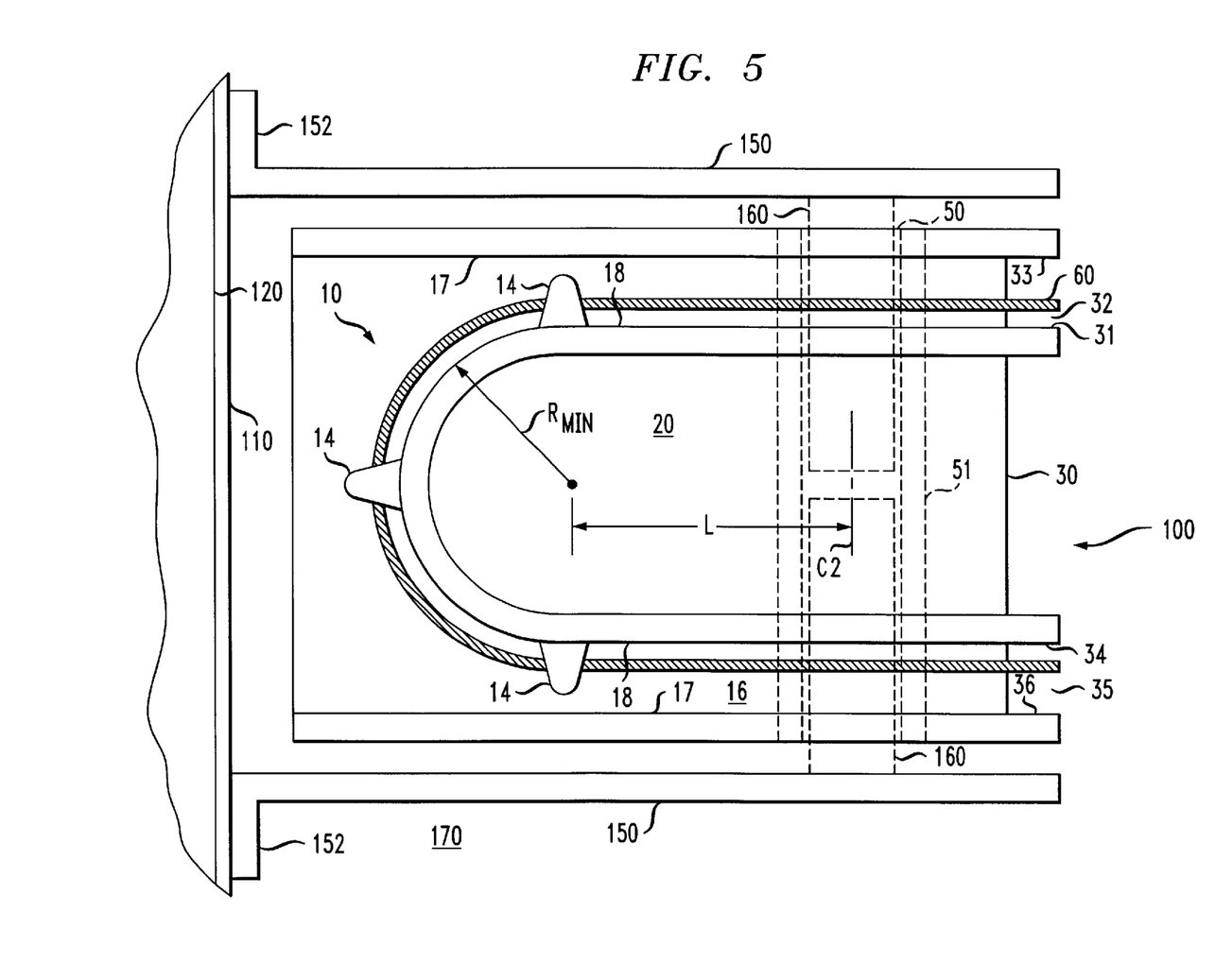
FIG. 5 is a side elevation view of a first wall mounted enclosure assembly containing a device as shown in FIG. 1.

FIG. 5 shows a first exemplary enclosure assembly 170 including a device 100. Exemplary assembly 170 includes a wall mounted enclosure 110 mounted to a wall 120, but device 100 may also be effectively used in other types of enclosures. The enclosure assembly 170 may, for example, be installed in the basement of a building.

The enclosure 170 has a pin or rod 160 mounted therein. The pin or rod 160 may be fastened to the wall of the enclosure 170 using simple mounting flanges 152, as shown in FIG. 5. The bore 50 extending through the device 100 receives the pin or rod 160, to pivotally mount the device in the enclosure 170. The annular space between the bore 50 and the rod 160 is exaggerated in FIG. 5. Preferably, the clearance between bore 50 and rod 160 is minimal, providing just enough resistance to rotation so that the device 100 stays put in any angular position, until moved by the user. The pin or rod may be formed of metal (e.g., steel) or plastic.

Preferably, as shown in FIG. 5, the distance L between the center C1 of spool 10 (or spool 11) and the axis C2 of bore 50 is greater than zero, and more preferably, L is greater than $R_{MIN}$. Each incremental increase $\Delta$ in the length L increases the fiber storage capacity of the device 100 by $4\Delta$. Most preferably, for a given enclosure depth, the distance L should be the maximum length that still permits the device 100 to pivot freely without either back edge 19 of the device contacting the rear wall of the enclosure. Thus, in preferred embodiments, the length of a fiber portion extending between the pair of spool portions is substantially greater than a perimeter of one of the spool portions. This allows for the most efficient fiber storage given a spool portion radius and a fixed enclosure depth.

In the example shown, each complete loop around the device 100 (e.g., beginning at spool portion 10, looping around spool portion 11, and returning to spool portion 10) has a total length equal to $(4)(\pi R_{MIN}+L)$. This is substantially greater than the length of a loop around a conventional fiber storage barrel of radius $R_{MIN}$, which would only be $2\pi R_{MIN}$. Thus, given any desired footprint, a device 100 according to the invention allows a substantially greater amount of slack fiber 60 to be stored than a conventional fiber storage barrel. The use of one or more devices 100 is particularly advantageous in deep enclosures, which allow the use of a taller device (having a larger length L).

Figure 6:
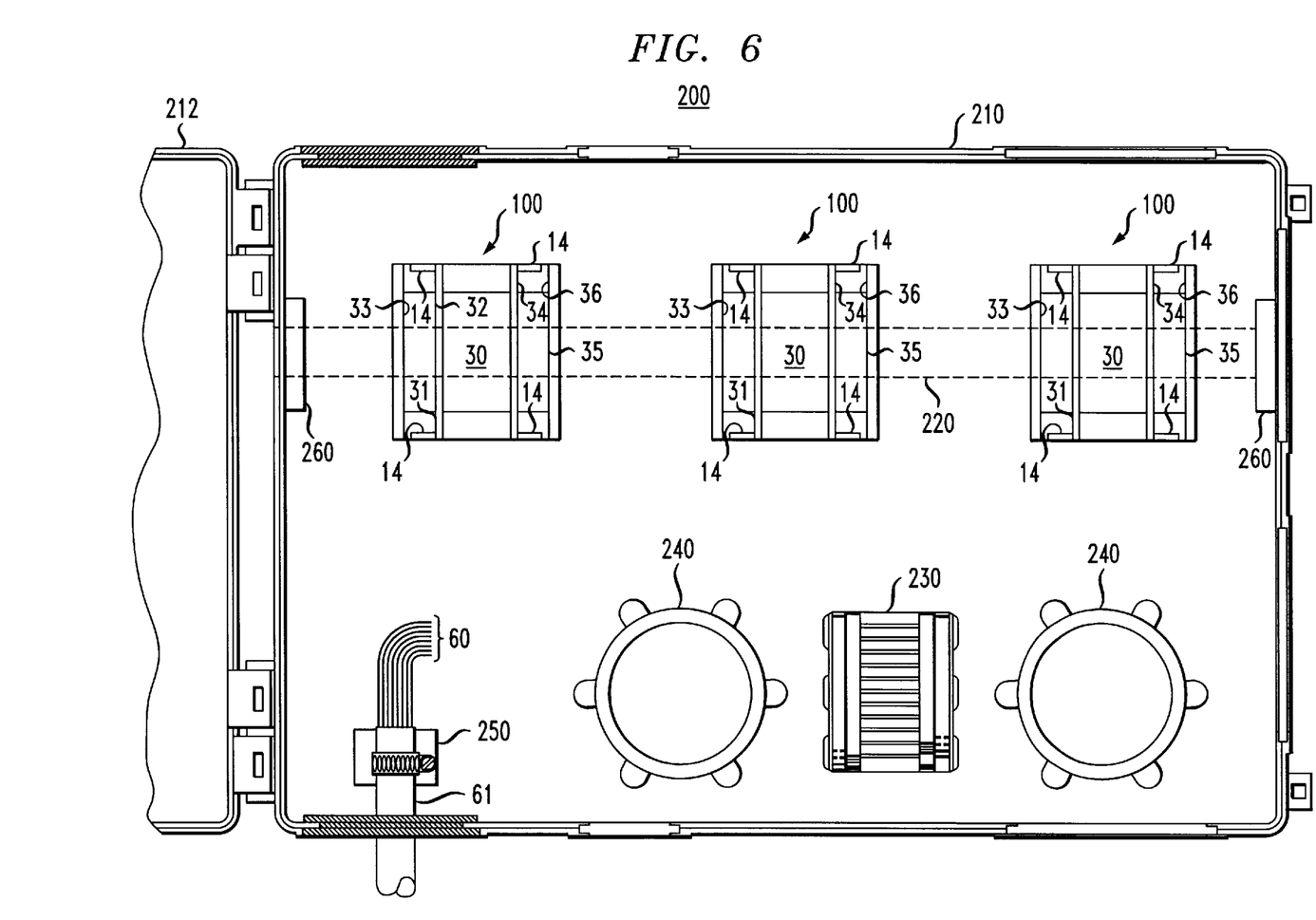
FIG. 6 is a front elevation view of a second wall mounted enclosure assembly containing a plurality of devices as shown in FIG. 1.
Figure 7:
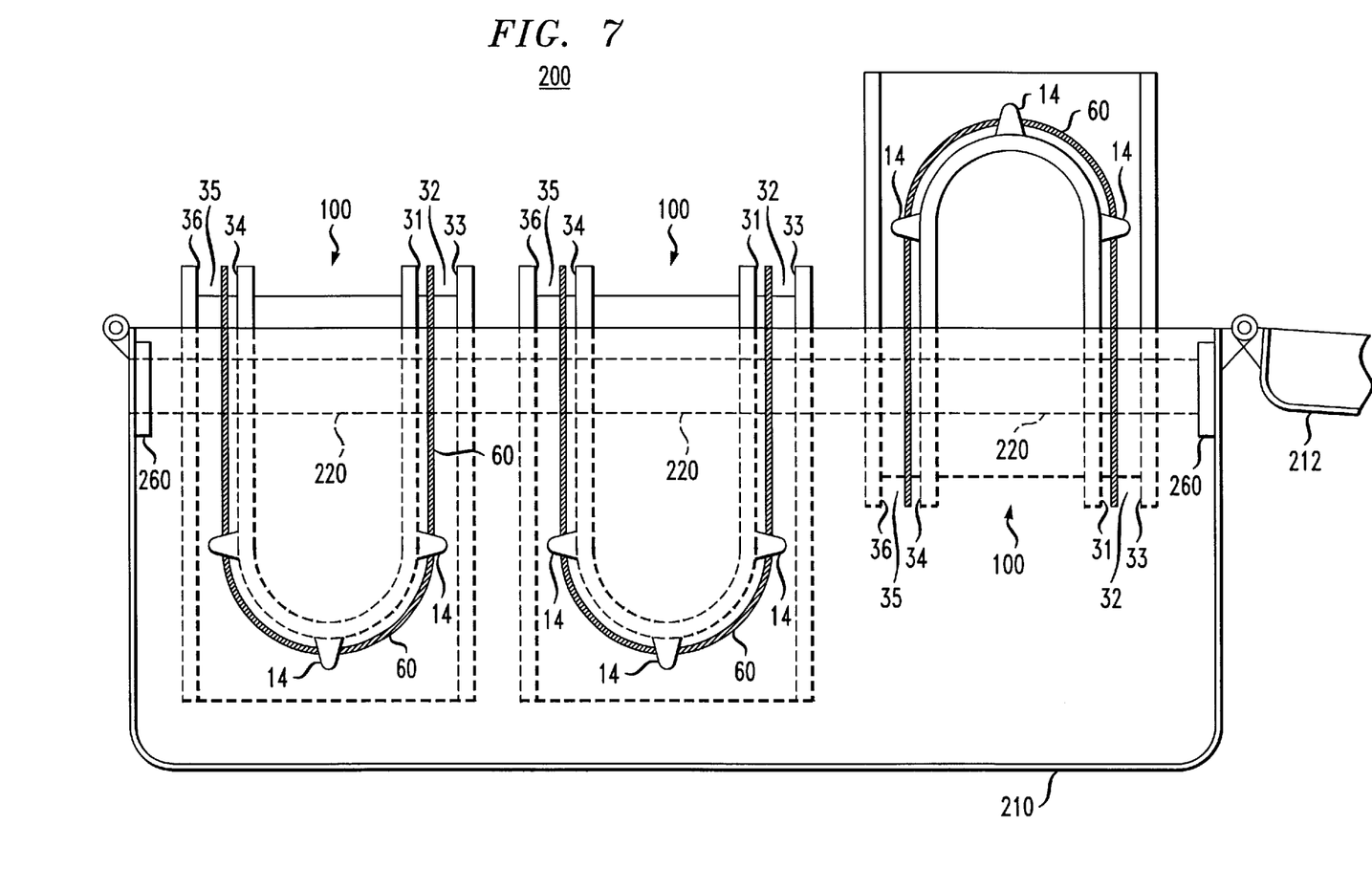
FIG. 7 is a top plan view of the assembly shown in FIG. 6.

FIGS. 6 and 7 show a second exemplary enclosure assembly 200, wherein the device 100 is one of a plurality of substantially identical devices or equivalent devices pivotally mounted within the enclosure 210. In assembly 200, a single rod or pin 220 is mounted between a pair of flanges 260 that are attached to the walls of the enclosure 210 by fasteners (e.g., screws, rivets or the like). Preferably, the clearance between bore 50 and rod 220 is minimal, providing just enough resistance to rotation so that the device 100 stays put in any angular position, until moved by the user. In assembly 200, each of the devices 100 is pivotable independently of each other one of the devices. Although the example of FIGS. 6 and 7 shows three devices 100, enclosure 200 may be configured to include any number of devices 100 that fit within the available space. For example, the enclosure may initially be configured with only one device 100, and subsequently, one, two or three additional devices 100 may be added as needed.

Also shown in FIGS. 6 and 7 are a splice holder 230 mounted within the enclosure 210, and a pair of conventional fiber storage barrels 240. The storage barrels 240 may be used to provide strain relief. For example, each of two fibers to be spliced together in the splice holder 230 may be wound once around the fiber storage barrels to provide strain relief before routing the bulk of the fiber slack to one of the devices 100. Other conventional strain relief mechanisms (e.g., troughs) may also be used.

Another aspect of the invention is a method for storing slack fiber. The method includes the steps of: winding the fiber 60 around a first spool portion 10 on a first side 20 of a storage device 100; winding the fiber 60 around a front end 30 of the storage device 100; pivoting the device 100; and winding the fiber 60 around the second spool portion 11.

As the winding progresses, a plurality of U-shaped loops of fiber 60 having a radius greater than or equal to $R_{MIN}$ are wound around the first spool portion 10, the front end 30 and the second spool portion 11. The step of winding the fiber 60 around the front end 30 of the device 100 includes winding the fiber within a top U-shaped channel 32 extending between a top of the first spool portion 10 and a top of the second spool portion 11, and winding the fiber within a bottom U-shaped channel 35 extending between a bottom of the first spool portion 10 and a bottom of the second spool portion 11.

Depending on the preference of the user, the slack fiber 60 can be wound around the device 100 in either of two different ways. The first variation keeps the device 100 still during the winding, and the fiber 60 is moved around the device. The second variation involves less movement of the fiber 60, but more pivoting of the device between a first position in which the first spool 10 portion is exposed and a second position in which a second spool portion 11 on a second side 40 of the storage device 100 opposite the first side 20 is exposed Using the first variation, the device 100 can be flipped to the position of the rightmost device 100 in FIG. 7, with both spool portions 10 and 11 extending out of the enclosure 210, and within easy reach. The user can then wind the fiber 60 around the spool portions 10, 11 and the U-shaped channels 32, 35. When the winding is completed, the device 100 is flipped back, so that the spool portions 10, 11 face downward, as shown by the left and middle devices 100 in FIG. 7. This position protects the fiber slack from inadvertent contact. The procedure described in this paragraph requires the user to reach under the device 100 and move the fiber around the device 100, but the device 100 need only be flipped once before the winding step and once after the winding step. The device 100 is not pivoted while winding.

Alternatively, the device 100 can be pivoted so that spool portion 10 is facing the front of the enclosure 210 (i.e., facing outward). The fiber 60 is wound around spool portion 10 and over to the top U-shaped channel 32. Then, while holding the fiber 60 still, the device 100 is pivoted by 180 degrees to wind the fiber around channel 32 and over to spool portion 11. The fiber 60 is wound around spool portion 11 and over to the bottom U-shaped channel 35. Then, while holding the fiber 60 still, the device 100 is pivoted 180 degrees in the opposite direction, to wind the fiber around channel 35 and return the fiber to spool portion 10. This procedure is repeated to alternately expose each of the first and second spool portions 10 and 11 for winding slack thereon. Using this procedure, the device 100 is flipped several times, but the fiber 60 can be wound onto the device without reaching under the device; winding is always performed around the spool portion that is facing forward (outward from the enclosure) at any given time. When the winding is completed, the device is returned to the storage position shown by the left and middle devices in FIG. 7.

Although the winding is described above with reference to a clockwise winding, the direction of the winding may alternatively be reversed, to perform a counter-clockwise winding.

The above-described method may be performed in conjunction with forming a fiber splice within the enclosure 210, or the slack fibers 60 may be pre-configured in the enclosure, to anticipate possible future splices. The device and method described herein allows the user to easily separate the slack fibers during initial installation, with each separated fiber group terminated to pre-specified connectors or splices.

The exemplary device 100 controls the fiber bend radius to maintain at least the minimum require radius. The device 100 provides four continuously connected U-shaped bends 10, 11, 32, 35 in a compact footprint. The device also provides protection for the stored slack fiber.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A device for storing fiber slack,
    said device having a pair of spool portions on opposite sides of said device, each spool portion shaped so that fiber slack can be wound back and forth between the two spool portions,
    said device being capable of being pivotally mounted within an enclosure, so that the pair of spool portions can be accessed by pivoting the device about a pivot axis,
    said device having a first channel top extending between a top of a first one of the pair of spool portions and a top of a second one of the pair of spool portions, and a second bottom channel extending between a bottom of the first one of the pair of spool portions and a bottom of the second one of the pair of spool portions,
    wherein the pair of spool portions and the first and second channels form an elongated spool for storing fiber, the elongated spool extending around a first side face, and a second side face and wherein the elongated spool wraps around a first end of the device between the first and second side faces, without extending around a second end face that is opposite the first end face and between the first and second side faces and the elongated spool wraps partially around the pivot axis without completely enclosing the pivot axis within the elongated spool.

2. The device of claim of claim 1, wherein each spool portion has a substantially semicircular shape.

3. The device of claim 2, wherein each spool portion has a radius at least as large as a minimum bend radius for a fiber to be stored on the device.

4. The device of claim 3, wherein a length of a fiber portion extending between the pair of spool portions is substantially greater than a perimeter of one of the spool portions.

5. The device of claim 1, wherein the device has a bore extending therethrough, for receiving a pin or rod, thereby to pivotally mount the device.

6. The device of claim 1, wherein the first and second channels are U-shaped.

7. An assembly comprising:
    an enclosure; and
    a device for storing fiber slack,
    said device having a pair of spool portions on opposite sides of said device, each spool portion shaped so that fiber slack can be wound back and forth between the two spool portions,
    said device being pivotally mounted within the enclosure, so that the pair of spool portions can be accessed by pivoting the device about a pivot axis,
    said device having a first top channel extending between a top of a first one of the pair of spool portions and a top of a second one of the pair of spool portions, and a second bottom channel extending between a bottom of the first one of the pair of spool portions and a bottom of the second one of the pair of spool portions,
    wherein the pair of spool portions and the first and second channels form an elongated spool for storing fiber, the elongated spool extending around a first side face, and a second side face and wherein the elongated spool wraps around a first end of the device between the first and second side faces, without extending around a second end face that is opposite the first end face and between the first and second side faces and the elongated spool wraps partially around the pivot axis without completely enclosing the pivot axis within the elongated spool.

8. The assembly of claim 7, wherein the first and second channels are U-shaped.

9. The assembly of claim of claim 7, wherein each spool portion has a substantially semicircular shape.

10. The assembly of claim of claim 9, wherein each spool portion has a radius at least as large as a minimum bend radius for a fiber to be stored on the device.

11. The assembly of claim 10, wherein a length of a fiber portion extending between the pair of spool portions is substantially greater than a perimeter of one of the spool portions.

12. The assembly of claim 7, wherein the device is one of a plurality of substantially identical devices pivotally mounted on the same pin or rod within the enclosure.

13. The assembly of claim 12, wherein each of the devices is pivotable independently of each other one of the devices.

14. The assembly of claim 7, wherein:
    the enclosure has a pin or rod mounted therein, and
    the device has a bore extending therethrough, for receiving the pin or rod, thereby to pivotally mount the device in the enclosure.

15. The assembly of claim 7, further comprising at least one splice holder mounted within the enclosure.

16. A method for storing slack fiber, comprising the steps of:
    (a) alternately pivoting a storage device around a pivot axis in opposite directions during slack fiber storage, between:
        (1) a first position in which a first spool portion on a first side face of the storage device can be accessed, and
        (2) a second position in which a second spool portion on a second side face of the storage device opposite the first side face can be accessed;

(b) winding the fiber around the first spool portion while the first spool portion can be accessed;

(c) winding the fiber around a front end of the storage device between the first and second side faces; and (d) winding the fiber around the second spool portion while the second spool portion can be accessed so the fiber partially wraps around the pivot axis without completely enclosing the pivot axis, wherein steps (a), (b), (c) and (d) are performed during slack fiber storage without winding the fiber around a back end of the storage device that is between the first and second side faces and opposite the front end and without completely enclosing the pivot axis within the wound fiber.

17. The method of claim 16, wherein the storage device is pivotally mounted in an enclosure, further comprising the step of:

forming a fiber splice within the enclosure.

18. The method of claim 16, wherein the second side face of the storage device cannot be accessed while the device is in the first position, and the first side face of the storage device cannot be accessed while the device is in the second position.

19. The method of claim 16, wherein the method comprises winding a plurality of U-shaped loops of fiber around the first spool portion, the front end and the second spool portion.

* * * * *